United States Patent [19]

Bannochie

[11] Patent Number: 4,501,803

[45] Date of Patent: Feb. 26, 1985

[54] POROUS GAS DIFFUSION-ELECTRODE

[75] Inventor: John G. Bannochie, Versoix, Switzerland

[73] Assignee: Eltech Systems Corporation, Boca Raton, Fla.

[21] Appl. No.: 527,184

[22] Filed: Aug. 29, 1983

[30] Foreign Application Priority Data

Sep. 9, 1982 [GB] United Kingdom ............... 8224974

[51] Int. Cl.$^3$ .......................... C25F 1/00; H01M 4/36
[52] U.S. Cl. ........................ 429/101; 429/27; 204/140; 204/284; 502/101
[58] Field of Search ............. 204/284, 292, 294, 140; 429/44, 27, 45, 101; 502/101

[56] References Cited

U.S. PATENT DOCUMENTS 4,191,618  3/1980  Coker ................................ 204/296
4,407,905  10/1983  Takeuchi ............................ 429/44

FOREIGN PATENT DOCUMENTS 918328  6/1963  United Kingdom .

*Primary Examiner*—John F. Niebling
*Attorney, Agent, or Firm*—Arthur S. Collins

[57] ABSTRACT

A porous gas-diffusion electrode having a ruthenium electrocatalyst is conditioned for operation as a hydrogen consuming anode by connecting the electrode as a cathode in a suitable electrolyte until it drops below the reversible hydrogen potential and evolves hydrogen. Preferably, the electrode is contacted with a hydrogen atmosphere prior to or at the beginning of hydrogen evolution, and conditioning may be carried out in situ in a cell in which the electrode is to operate as hydrogen consuming anode.

8 Claims, No Drawings

POROUS GAS DIFFUSION-ELECTRODE

TECHNICAL FIELD

The invention relates to porous gas-diffusion electrodes and in particular to the conditioning of such electrodes having a ruthenium electrocatalyst for operation as a hydrogen consuming anode.

BACKGROUND ART

Porous hydrophobic gas diffusion electrodes made from electrocatalysts and PTFE (or similar material as binder and hydrophobic component) on a porous conducting support are known for use as fuel cell electrodes and for similar applications.

All the noble metals have been proposed as catalysts, although platinum in the form of high surface area platinum blacks either alone or supported on carbon has been most widely used both for hydrogen oxidation and oxygen reduction.

For hydrogen oxidation in particular, platinum-rhodium catalysts have been used as carbon monoxide tolerant catalysts in acid and platinum-palladium catalysts have been used in alkali to reduce the quantity of expensive platinum. Platinum-ruthenium catalysts have also been proposed in the literature. Ruthenium alone has been reported to be unsatisfactory, although obviously it would be advantageous from a cost standpoint if it could be made to perform as well as platinum or the other platinum group metals or their mixtures or alloys.

DISCLOSURE OF INVENTION

The invention, as set out in the claims, is based on the finding that ruthenium (which is 1/10th the cost of platinum) can be made to give excellent behavior as a hydrogen oxidation catalyst in alkaline and acid electrolytes by subjecting it to a simple conditioning procedure which is conveniently carried out in situ in a cell in which the ruthenium catalysed electrode is to operate. The conditioning procedure involves cathodic polarization of the electrode in a suitable alkaline or acid electrolyte until the electrode drops below the reversible hydrogen evolution potential and evolves hydrogen. The cathodic current during conditioning is typically quite low (a current density as low as 1 mA/cm$^2$ has given good results) and will rarely exceed 10% or at most 50% of the cathodic current if the electrode is subsequently used as a reversible hydrogen evolving cathode-hydrogen consuming anode. The low conditioning current must be passed for a sufficient time to reduce any surface oxidation on the ruthenium and allow the electrode potential to reach the reversible hydrogen potential. After the electrode has reached the reversible hydrogen potential, this low cathodic conditioning current may conveniently continue for 5–10 minutes during which time hydrogen will be evolved on the electrode, before switching the electrode to hydrogen consumption or to hydrogen evolution at full current. It is also convenient to pass hydrogen into the cell just before or at the beginning of conditioning.

The conditioned ruthenium electrodes have performed very well both for hydrogen consumption and as reversible electrodes for hydrogen evolution and consumption. For a given loading (say 1 mg/cm$^2$) the performance is comparable with platinum and there are indications that the life may be longer. In operation, the conditioned electrodes will remain very close to the reversible hydrogen potential, generally within several tenths of a millivolt per mA/cm$^2$, and rarely exceeding 1.5 mV per mA/cm$^2$.

It is understood that the hydrogen consumed by the anodes may be substantially pure hydrogen or it may be a suitable hydrogen-containing mixture such as reformer gas which contains hydrogen and carbon monoxide.

By ruthenium and ruthenium catalyst is meant either substantially pure ruthenium metal (which will be partially surface oxidized prior to the conditioning) or ruthenium admixed or in solid solution with other catalytic metals, in such quantities that the properties of the ruthenium are predominant, i.e. usually not exceeding 5% by weight of the ruthenium electro-catalyst.

In most applications, the ruthenium electrocatalyst is deposited in finely divided carbon by the reduction of a ruthenium salt using a suitable reducing agent such as formaldehyde and the ruthenium-catalysed carbon is usually mixed with and further coated on the gas-side with a hydrophobic agent such as polytetrafluorethylene.

BEST MODE FOR CARRYING OUT THE INVENTION

The invention will be further illustrated in the following Example.

EXAMPLE

The electrodes are made by mixing ruthenium catalysed carbon and a binder such as polytetrafluorethylene (PTFE) and pressing into thin sheets.

Preferably, the ruthenium catalysed carbon contains 3–10% by weight of ruthenium and is prepared as follows. The soluble form of ruthenium chloride is dissolved in water to obtain a solution of concentration 0.05–0.1M ruthenium (depending on the solubility). Add to this solution the appropriate weight of active carbon to give the required Ru:C ratio with stirring to obtain a thick creamy consistency. Add an excess of reducing agent, for example, formaldehyde, followed by a large excess of hot concentrated caustic potash. Allow to cool, then filter and wash with distilled water.

Electrodes containing 20–25% PTFE on a dry solids basis have been found satisfactory.

Take an aqueous dispersion of PTFE such as Fluon GPI (Trademark of I.C.I.) dilute about 10 times with water and add the appropriate weight of the ruthenium catalysed carbon with stirring and further addition of water to give a suspension suitable for filtration.

Filter the suspension through filter paper on a flat bed filter similar to a Buchner funnel except that it may be square or rectangular. The volume of suspension is determined by the area of the filter and the required ruthenium content which is for example 1 mg/cm$^2$ of electrode area. Allow to filter under gravity alone, then apply suction to consolidate and dry the filter cake.

Take finely woven nickel gauze as the metal conductor or current collector. Cut slightly larger than the required final dimensions, then degrease. Invert the filter funnel to deposit the filter cake, paper side up, on the metal gauze. Press the filter cake firmly on to the gauze and detach the paper.

Dry and substantially remove wetting agent by heating the electrode up to 150° C. and holding for 1 hour. Press at 200 kg/cm$^2$.

Paint or spray the back of the electrode with dilute Fluon GPI to provide a hydrophobic backing layer.

Heat up to 150° C. again hold for 1 hour and repress at 200 kg/cm$^2$.

Before using the electrode as a hydrogen anode it has been found necessary to condition it by carrying out an in situ cathodic reduction of the oxide film on the ruthenium surface, as follows.

Mount the electrode in an electrolytic cell, metal gauze facing the electrolyte side, the hydrophobic back enclosed within the hydrogen compartment. Typically, the electrolyte will be 5M KOH. Pass hydrogen to displace air from the compartment and at the same time pass a cathodic current which may be as small as 1 mA/cm$^2$ until the electrode potential reaches a level just below the reversible hydrogen potential. Leave for 5–10 minutes evolving hydrogen at a low rate, then open the current and allow the electrode to stabilize at the reversible hydrogen potential.

Electrodes with a 1 mg/cm$^2$ loading of ruthenium prepared and conditioned as above have performed excellently as hydrogen evolving anodes and as reversible hydrogen consuming anodes/hydrogen evolving cathodes. When cycled at 50 mA/cm$^2$ at the one hour rate (1 hour anodic, 1 hour cathodic) in 5M KOH at ambient temperature, the anodic polarisation is only 23 mV after 4000 hours.

When an unconditioned electrode is made anodic under similar conditions, it rapidly breaks down as demonstrated by the following test. An electrode prepared as above was cut into two halves. One half was submitted to the cathodic conditioning treatment, and the other half was simply exposed to hydrogen flow for $\frac{1}{2}$ hour. The two electrode halves were connected anodically in 5M KOH under a hydrogen atmosphere and the anodic potentials were measured. At a current density of 50 mA/cm$^2$, the conditioned electrode half had a potential of 60 mV (above the reversible hydrogen potential) whereas the non-conditioned electrode half had a potential of about 1250 mV i.e. approximately at the reversible oxygen potential. Ruthenium is not stable at the oxygen evolution potential particularly in an alkaline electrolyte and the non-conditioned electrode half failed after approx. $\frac{1}{2}$ hour; presumably it was operating to evolve oxygen which was chemically reduced by hydrogen gas.

INDUSTRIAL APPLICABILITY

Since the conditioned ruthenium is an excellent catalyst for both hydrogen consuming and hydrogen evolving reactions, an ideal application for the electrode is in secondary metal-hydrogen cells, such as Ni-H$_2$ or Ag-H$_2$ where hydrogen is evolved on charge and consumed on discharge and there is a permanent atmosphere of hydrogen in the sealed cells. Conditioned electrodes according to the invention have been incorporated into experimental Ni-H$_2$ cells and cycled (1 hour anodic/1 hour cathodic at a current density of 27 mA/cm$^2$ in this case) for 1000 hours. In these conditions, the cell performance was comparable with or better than similar cells incorporating platinum catalysed hydrogen electrodes.

Another application of the conditioned ruthenium anodes is in caustic production by the electrolysis of sodium salts such as NaCl and Na$_2$SO$_4$ wherein hydrogen supplied to the conditioned anode produces hydrochloric acid or sulphuric acid, instead of chlorine or oxygen.

The conditioned ruthenium anodes can also be used in alkaline fuel cells, providing precautions are taken to insure that in the event of a temporary failure of the hydrogen supply the anode potential will not drift to levels at which ruthenium is soluble.

Another application of the conditioned ruthenium anodes is for the electrowinning of metals, such as zinc and copper from acid electrolytes such as sulphuric acid in which ruthenium metal is stable up to about 800 mV (NHE). By supplying hydrogen to the conditioned ruthenium anodes according to the invention in the metal electrowinning process, considerable energy savings can be achieved.

I claim:

1. A method for conditioning a porous gas-diffusion electrode having ruthenium metal as its predominant electrocatalyst prior to its operation as a hydrogen consuming anode, characterized by connecting the electrode as a cathode in a suitable electrolyte and passing a cathodic current therethrough until said electrode drops below the reversible hydrogen potential and evolves hydrogen.

2. The method of claim 1, which is carried out in situ in a cell in which the electrode is to operate as hydrogen consuming anode and said conditioning current is passed at a current density substantially below that at which it is to operate as said anode.

3. The method of claim 1, in which the electrode is contacted with a hydrogen atmosphere prior to or at the beginning of hydrogen evolution.

4. The method of claim 1, in which the ruthenium electrocatalyst has been deposited in finely divided carbon by the reduction of a ruthenium salt.

5. A porous gas-diffusion electrode having a ruthenium electrocatalyst which has been conditioned by the method of claim 1.

6. A metal-hydrogen battery comprising a hydrogen-consuming anode in the form of a gas-diffusion electrode conditioned by the method of claim 1.

7. The method of claim 1, wherein the content of other catalytic metals in said electrocatalyst does not exceed about 5% of the weight of ruthenium.

8. The method of claim 1, wherein the ruthenium in said electrode is partially oxidized on its surface, and passage of said current is continued until said oxidized surface has been substantially eliminated.

* * * * *